United States Patent [19]

Wafer et al.

[11] 4,358,810
[45] Nov. 9, 1982

[54] CIRCUIT BREAKER WITH ALARM

[75] Inventors: John A. Wafer, Beaver; William E. Beatty, Jr., Beaver Falls; Alan B. Shimp, Monroeville, all of Pa.

[73] Assignee: Westinghouse Electric Corp., Pittsburgh, Pa.

[21] Appl. No.: 226,951

[22] Filed: Jan. 21, 1981

[51] Int. Cl.³ .............................................. H02H 3/08
[52] U.S. Cl. ..................................... 361/93; 361/115; 361/173; 340/644; 340/638; 340/664
[58] Field of Search ....................... 361/93, 94, 95, 96, 361/97, 115, 173, 175, 176, 179, 71–75; 340/644, 638, 639, 660, 661, 593, 664; 335/17, 116

[56] References Cited

U.S. PATENT DOCUMENTS

| | | |
|---|---|---|
| 3,213,323 | 10/1965 | Circle . |
| 3,634,729 | 1/1972 | Hendry et al. . |
| 3,689,801 | 9/1972 | Engel et al. . |
| 3,872,473 | 3/1975 | Melgaard et al. ............... 340/644 X |
| 4,004,201 | 1/1977 | Depuy ............................. 340/638 X |
| 4,004,258 | 1/1977 | Arnold ................................. 335/17 |

Primary Examiner—Patrick R. Salce
Attorney, Agent, or Firm—M. J. Moran

[57] ABSTRACT

A circuit breaker and alarm device for a circuit having a series connected interruptible current device whereupon a circuit breaker tripping means, attached to said circuit breaker, is adapted to obtain an output voltage of one polarity upon the tripping of the circuit breaker. A circuit breaker resetting device, attached to said circuit breaker, is adapted to obtain an output voltage of reverse polarity upon the resetting of the circuit breaker. A voltage-detecting circuit for sensing the voltage produced by the tripping or resetting of the circuit breaker. A current detecting circuit which produces an output upon detecting an output produced by the voltage-detecting circuit. An alarm circuit which is connected to the current-detecting circuit is thereby caused to essentially instantaneously upon the tripping of the circuit breaker, to energize and remain energized until the resetting of the circuit breaker.

7 Claims, 1 Drawing Figure

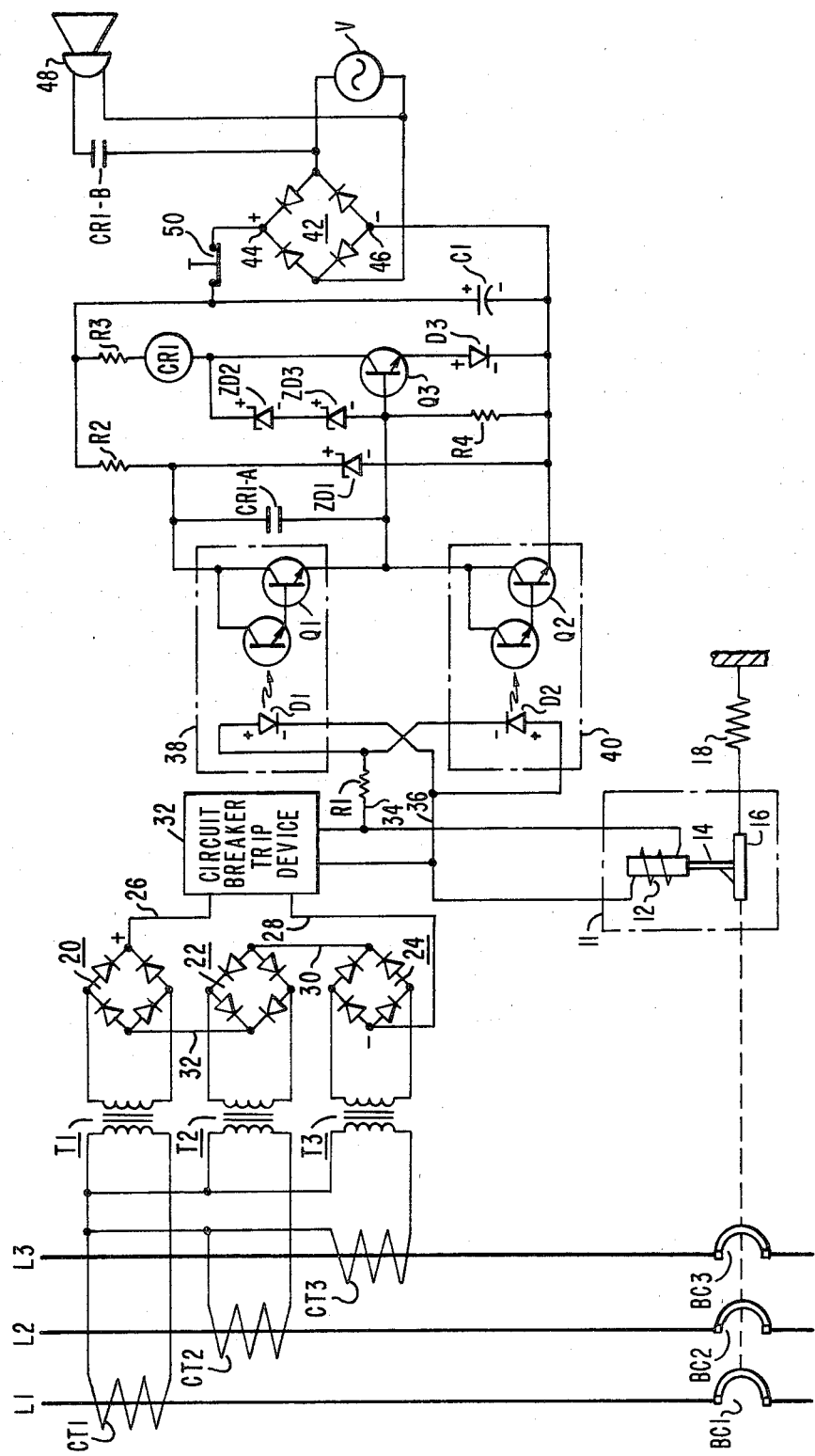

CIRCUIT BREAKER WITH ALARM

BACKGROUND OF THE INVENTION

1. Field of the Invention

This invention relates to circuit breaker apparatus and more particularly to circuit breaker-alarm combinations automatically providing operator notification upon tripping of the circuit breaker.

2. Description of the Prior Art

Whenever a circuit breaker device trips, it is desirable and sometimes necessary to have an alarm produced which draws an operator's attention to the fact that a circuit breaker has tripped. Fusing devices have had this alarm feature for many years. However, with the advent of circuit breakers, alarm devices are generally mechanically linked to the circuit breaker and require installation at the time of manufacture. Such mechanically actuated alarms generally utilize a micro-switch in conjunction with the main circuit breaker contacts. However, if the circuit breaker primary contacts weld upon an attempt to trip, the alarm may not go off.

U.S. Pat. No. 3,689,801 "Circuit Breaker Including Improved Current Auctioneering Circuit", issued Sept. 5, 1972, to Engel et al. assigned to the assignee of the present invention, illustrates certain circuit breaker apparatus which typically would require a microswitch for alarm purposes, but already produces an output upon tripping or resetting of the circuit breaker. Such a circuit breaker is readily adaptable to the method taught in the present patent and is typical of many electronic circuit breakers in use today.

It is desirable to have an alarm device which is mountable at the time of manufacture or at a later date, in the field. It is also desirable to have an alarm which will energize regardless of contact welding; that is, when the trip unit signals the circuit breaker to trip, not being deenergized until the resetting of the circuit breaker.

SUMMARY OF THE INVENTION

Briefly stated, a circuit breaker having separable contacts and having a line-current sensing transformer for monitoring the level of current in the circuit to be controlled, is connected to a circuit breaker trip device which upon sensing an over current condition in excess of a predetermined level, produces a direct current output of one polarity thereby causing the production of a high voltage thereby energizing a flux transfer shunt trip mechanism which causes the circuit breaker to trip via a mechanical linkage. Upon the resetting of the circuit breaker the mechanical linkage resets the flux transfer shunt trip mechanism thereby inducing a high voltage direct current output of reverse polarity. The flux transfer shunt trip mechanism in addition to being connected to the circuit breaker trip device may be connected to a pair of unidirectional resistors, thereby being responsive to the tripping or resetting of the circuit breaker. A pair of current detectors is coupled to the unidirectional resistors to produce a flow of current substantially instantaneously upon the tripping or resetting of the circuit breaker. An alarm is connected to the current detector and is energized by the output of the first of the pair of current detectors and remains energized until a reverse polarity voltage, produced upon the resetting of the circuit breaker by the flux transfer shunt trip mechanism, causes the second of the pair of current detectors to deenergize the alarm.

BRIEF DESCRIPTION OF THE DRAWING

Reference is now made to the description of the preferred embodiment illustrated in the accompanying drawing which is a schematic diagram, partly in block form of the line-current sensing mechanism in conjunction with the circuit breaker tripping device connected to the alarm circuit.

DESCRIPTION OF THE PREFERRED EMBODIMENT

Construction of the Alarm Device

Referring now to the FIGURE, the circuit breaker trip device is associated with the line conductors L1, L2 and L3 of a three-phase alternating current system and is typically designed for operation at a frequency of 60 Hz.

A circuit breaker CB is provided for isolating and controlling sections of an electrical system under particular abnormal conditions such as line faults which cause an overcurrent condition. The circuit breaker CB has a number of breaker contacts which are separable BC1, BC2 and BC3. The operation of the breaker contacts is controlled by a flux transfer shunt trip mechanism 11 which is comprised of a trip coil 12 which actuates an operating member 14 thereby allowing a release member 16 to facilitate the opening of the breaker contacts BC1, BC2 and BC3. The opening of the breaker contacts BC1, BC2 and BC3 is influenced by spring member 18 which is connected to the release member 16 and to the breaker contacts BC1, BC2 and BC3. In general, the protective device shown is arranged to respond to the highest or largest of the line currents which flow in the conductors L1, L2 and L3 to energize the trip coil 12 and to actuate the tripping of the circuit breaker CB when the largest or highest of the line currents in the conductors exceeds a predetermined value or level.

In order to obtain a plurality of output alternating currents which are directly proportional to the line current in the conductors L1, L2 and L3, a plurality of current transformers CT1, CT2 and CT3 are provided, with the primary windings of the current transformers being energized in accordance with the line currents and the conductors. The windings of the current transformers CT1, CT2 and CT3 may be Wye-connected. In order to further step down the output current of the current transformer CT1, CT2 and CT3, the intermediate transformers T1, T2 and T3 are connected between the windings of said current transformers and the plurality of full-wave bridge-type rectifier circuits 20, 22 and 24. The unidirectional output terminals of the bridge circuits 20, 22 and 24 may be connected in series circuit relation by the electrical conductors 30 and 32. The positive and negative output terminals of the bridge circuits 26, 28 respectively, form the overall output of a line-current sensing mechanism. The unidirectional output current of the line-current sensing mechanism is substantially proportional to only the highest or largest of the line currents of the conductors L1, L2 and L3.

The line-current sensing mechansim is connected to the circuit breaker trip device 32. The circuit breaker trip device 32 is responsive to current in the conductors L1, L2 and L3 as measured by the current transformers CT1, CT2 and CT3 in conjunction with transformers T1, T2 and T3 being connected to full-wave bridge rectifier circuits 20, 22 and 24. The operation of the control device 32 is explained in more detail and is a product of U.S. Pat. No. 3,689,801, previously mentioned.

A time delay, which varies substantially inversely with the square of the highest of the line currents, is initiated when the largest or highest of the line currents in the conductors exceeds a predetermined value, thereby allowing the circuit breaker trip device 32 to energize the trip coil 12.

The alarm device responds to the voltage produced across the trip coil 12. A resistor R1 is connected at one end to trip coil conductor 34 and at the other end to the positive terminal of diode D1 and to the negative terminal of diode D2. The positive terminal of diode D2 and the negative terminal of diode D1 are connected together and then connected to trip coil conductor 36.

The power necessary to maintain the alarm device in an energized state is derived from a voltage source V which may be 120 volts, 60 Hz, but other suitable voltages as well as frequencies could be utilized. This voltage source V is connected to the input terminals of a full-wave bridge rectifier circuit 42. The positive output 44 of full-wave bridge 42 is connected to the positive terminal of a filtering capacitor C1 and to one end of resistors R2 and R3. The negative terminal of the capacitor C1 is connected to the negative terminal 46 of full-wave bridge rectifier circuit 42. The other terminal of resistor R3 is connected to one end of the coil of relay CR1 with the other end of the coil of relay CR1 being connected to the collector of transistor Q3. The emitter of transistor Q3 is connected to the positive terminal of diode D3. The negative terminal of diode D3 is connected to the negative terminal 46 of full-wave bridge 42. The other end of resistor R2 is connected to the positive terminal of zener diode ZD1 and to one of the contacts for contact set CR1-A of relay CR1 and also to the collector of transistor Q1. The negative terminal of zener diode ZD1 is connected to the negative terminal 46 of full-wave bridge 42. The emitter of transistor Q1 is connected to the collector of Q2, the remaining contact of contact set CR1-A contained in relay CR1, the base of transistor Q3, one of the terminals of resistor R4 and to the negative terminal of zener diode ZD3. The positive terminal of zener diode ZD3 is then connected to the positive terminal of zener diode ZD2 with the positive terminal of zener diode ZD2 being connected to the collector of transistor Q3. The emitter of transistor Q2 and the other end of resistor R4 are connected to the negative terminal 46 of full-wave bridge 42. Transistor Q1 along with diode D1 form part of an opto-isolator 38 and transistor Q2 along with diode D2 form part of a second opto-isolator 40. One of the terminals of the audible alarm 48 is connected to one of the input terminals of full-wave bridge 42 and the other terminal of audible alarm 48 is connected to one of the contacts of contacts set CR1-B contained in relay CR1. The other contact of contact set CR1-B is connected to the remaining input terminal of full-wave bridge 42.

OPERATION OF THE ALARM DEVICE

When the circuit breaker trip device 32 senses an overcurrent condition in line conductors L1 or L2 or L3, in excess of a predetermined level the circuit breaker trip device 32 produces a relatively low voltage output thereby causing current to flow in the trip coil 12. Upon the flowing of current in trip coil 12, the armature 14 which is influenced by spring member 18 moves, thereby urging release member 16 to open the contacts BC1, BC2 and BC3. The movement of the operating member in the trip coil 12 causes a change in magnetic flux in the coil 12 inducing a direct current relatively high voltage output on trip coil conductors 34 and 36, where trip coil conductor 34 is positive with respect to trip coil conductor 36. This in turn causes current to flow through resistor R1 and diode D1 and then to trip coil conductor 36. Upon the production of a current flow in diode D1, which is part of opto-isolator 38, transistor Q1 becomes saturated. Upon the saturation of transistor Q1, current flows through resistor R2 and transistor Q1 causing transistor Q3 to become saturated. Upon the saturation of transistor Q3, current flows through the collector-emitter junction of transistor Q3, causing current to flow through the coil of relay CR1. This causes relay CR1 to become energized thereby closing contacts CR1-A and CR1-B. Upon the closing of relay contacts CR1-A, current flows through resistor R2 to the base of transistor Q3 thereby causing transistor Q3 to remain in a saturated state regardless of the state of transistor Q1. Additionally, upon the closing of relay contacts CR1-B, the alarm device 48 is caused to sound an audible alarm. It is to be understood that the alarm device 48 may be visual in place of or in addition to an audible signal. Current to the base of transistor Q3 through relay contacts CR1-A causes the alarm to remain energized regardless of the presence of voltage being supplied to the trip coil 12.

Upon the resetting of the circuit breaker CB, the operating member 14 is reset mechanically to its normal, untripped position. This movement of the operating member 14 through trip coil 12 induces a relatively high voltage direct current output across trip coil 12 whereby the polarity of trip coil conductor 36 is positive with respect to trip coil conductor 34. This causes current to flow serially first through diode D2 of second opto-isolator 40, through resistor R1 and thence to trip coil conductor 34. This causes transistor Q2 of second opto-isolator 40 to become saturated. Transistor Q2 once saturated essentially causes the base and emitter of transistor Q3 to be shorted, thereby causing transistor Q3 to turn off momentarily. When transistor Q3 is turned off, relay CR1 is forced to drop out. Since no current is flowing through the coil, the conacts CR1-A open which removes the source of base current for transistor Q3. Additionally, the value of resistor R3 is calculated so as to cause the rapid dropout of relay CR1, forcing the relay coil current to zero. The series connected zener diodes ZD2 and ZD3 are for clamping down any excessive transient voltages, which may be produced upon the dropout of relay CR1, which could be destructive to transistor Q3. Zener diode ZD1 is for limiting the maximum voltage which might appear across the series connected transistors Q1 and Q2. Diode D3 is to insure that transistor Q3 is turned off upon the saturation of transistor Q2. This insures the rapid dropout of relay CR1 during the short duration of the trip coil voltage. Also upon the dropout of relay CR1, relay contacts CR1-B open thereby causing audible alarm 48 to be deenergized.

Therefore, it is shown that upon the occurrence of an over current condition, the circuit breaker trip device 32 energizes the trip coil 12 of the circuit breaker CB, whereby a voltage of one polarity is produced which energizes the alarm circuit and therefore the audible alarm 48. The audible alarm 48 remains energized until the reset of the circuit breaker CB, which produces a voltage of reverse polarity, across trip coil 12 thereby causing the alarm circuit to deenergize the audible alarm 48.

It is to be understood that the audible alarm 48 while being shown as connected to the voltage source V may be connected to a different portion of the alarm circuit, therby eliminating a set of contacts on the relay CR1. It is also possible that the audible alarm 48 may be powered from a separate voltage source other than voltage source V. While only the preferred embodiment of the invention has been shown, it should be understood that many modifications are possible without departing from the spirit and scope of the invention. For example, a normally closed pushbutton switch 50 may be serially inserted between the positive output 44 of full-wave bridge 42 and the positive terminal of capacitor C1. This would allow the alarm circuit to be deenergized without the necessity of resetting the circuit breaker. Additionally, zener diode ZD2 and ZD3 could be combined to a single zener diode.

Thus, the disclosed invention produces an alarm device which may be either connected at the time of manufacture of a circuit breaker having a circuit breaker trip device, or separately mountable in the field at a later date requiring insignificant modification to the structure and apparatus contained in a circuit breaker.

What we claim is:

1. A circuit breaker alarm system for a circuit having an interruptable current device, comprising:
    circuit breaker means in series relationship with said circuit having separable contacts for interrupting the flow of current therein;
    circuit breaker tripping means attached to said circuit breaker means adapted to obtain an output voltage upon the tripping of said circuit breaker;
    circuit breaker resetting means attached to said circuit breaker means adapted to obtain an output voltage upon the resetting of said circuit breaker;
    directional resistive means being connected in parallel with said circuit breaker tripping means and said circuit breaker resetting means to produce a unidirectional current flow upon the tripping or resetting of said circuit breaker means;
    current detecting means coupled to said directional resistive means to produce a substantially instantaneous output upon the flow of current in said directional resistive means upon the tripping or resetting of said circuit breaker means; and
    alarm means coupled to said current detecting means for energizing an alarm upon the tripping of said circuit breaker.

2. A circuit breaker alarm system as defined in claim 1 wherein said alarm means is deenergized upon the resetting of said circuit breaker.

3. A circuit breaker alarm system as defined in claim 1 wherein said directional resistive means comprises as least one resistor and one unidirectional rectifying means, in series relation for producing a unidirectional current flow upon the tripping or resetting of said circuit breaker means.

4. A circuit breaker alarm system as defined in claim 1 wherein the current detecting means comprises at least one opto-isolator.

5. A circuit breaker alarm system for a circuit having an interruptable current device, comprising:
    circuit breaker tripping means attached to a circuit breaker adapted for obtaining an output voltage upon the tripping of said circuit breaker;
    circuit breaker resetting means attached to said circuit breaker adapted for obtaining an output voltage upon the resetting of said circuit breaker;
    an alarm;
    voltage detecting circuit means connected to said circuit breaker tripping means and said circuit breaker resetting means for substantially instantaneously producing a first output current pulse upon the tripping of said circuit breaker and for substantially instantaneously producing a second output current pulse of opposite polarity upon the resetting of said circuit breaker;
    energizing circuit means connected to said voltage detecting means and to said alarm for energizing said alarm at the occurrence of said first pulse; and
    holding circuit means connected to said energizing circuit means to maintain said alarm in an energized state until the occurance of said second pulse.

6. A circuit breaker alarm system as defined in claim 5 wherein the voltage detecting means comprises a resistor connected in series with the input terminals of an opto-isolator.

7. A circuit breaker alarm system as defined in claim 5 wherein the circuit breaker tripping means and the circuit breaker resetting means are comprised of a line-current sensing circuit and a flux transfer shunt trip mechanism which produces a positive or negative voltage substantially instantaneously upon the tripping or resetting, respectively, of the circuit breaker.

* * * * *